United States Patent [19]

Shiba et al.

[11] Patent Number: 5,121,449
[45] Date of Patent: Jun. 9, 1992

[54] INFORMATION DETECTING SYSTEM OF SCANNING TYPE

[75] Inventors: Masataka Shiba; Ryuichi Funatsu, both of Yokohama; Motoya Taniguchi, Kamakura; Minoru Tanaka; Akira Inagaki, both of Yokohama, all of Japan

[73] Assignee: Hitachi, Ltd., Tokyo, Japan

[21] Appl. No.: 513,911

[22] Filed: Apr. 24, 1990

[30] Foreign Application Priority Data

Apr. 26, 1989 [JP] Japan ................... 1-104408

[51] Int. Cl.$^5$ .............................. G02B 6/12
[52] U.S. Cl. ........................ 385/14; 385/4; 385/7; 385/1; 369/44.12
[58] Field of Search ............... 350/96.12, 96.13, 96.14; 369/44.12; 385/4, 7, 1, 14, 12

[56] References Cited

U.S. PATENT DOCUMENTS

| | | | |
|---|---|---|---|
| 4,629,313 | 12/1986 | Tanimoto | 355/53 |
| 4,737,946 | 4/1988 | Yamashita et al. | 369/44.12 |
| 4,747,090 | 5/1988 | Yamashita et al. | 369/44.12 |
| 4,797,867 | 1/1989 | Sunagawa et al. | 369/44.12 |
| 4,802,153 | 1/1989 | Kataoka et al. | 369/44.12 |
| 4,945,525 | 6/1990 | Yamamoto et al. | 369/44.12 |

FOREIGN PATENT DOCUMENTS 59-74625 4/1984 Japan .

OTHER PUBLICATIONS

Akira Arimoto, et al., "Micro-Optics News", edited by The Japan Society of Applied Physics, vol. 6, No. 3, 1988, pp. 13–16, particularly pp. 13–14, a partial English translation is provided.

Shogo Ura, et al., "An Integrated-Optice Disk Pickup Device", The Technical Research and Study Report QQE85-72, 1985, pp. 39–46, particularly p. 40, English translation Sect 2.1 only.

"Optical Integrated Circuits", edited by the Members in the Meeting of Optical Engineers of the Japan Society of Applied Physics, 1988, pp. 179–194, particularly pp. 179–180 only, a partial English translation is provided.

Laurin Publishing Company, Inc., The Photonics Dictionary, pp. 247 (1990).

Applied Optics, Waveguide optical deflector for an optical disk tracking actuator using a surface acoustic wave device, vol. 29, No. 2, pp. 247–250.

Primary Examiner—John D. Lee
Assistant Examiner—Stephen W. Barns
Attorney, Agent, or Firm—Fay, Sharpe, Beall, Fagan, Minnich & McKee

[57] ABSTRACT

Disclosed is an information detecting system of scanning type which comprises a substrate formed with an optical waveguide layer, a laser oscillator emitting a laser beam, a SAW type beam deflecting device formed on the optical waveguide layer, a beam irradiating section irradiating a specimen with the laser beam derived from the optical waveguide layer, a controller controlling the frequency of a high-frequency voltage applied to the SAW type beam deflecting device so as to scan the specimen with the laser beam directed from the beam irradiating section, and a detecting section detecting the position and/or the intensity of the laser beam scanning the specimen with respect to the SAW control signal controlled by the controller.

25 Claims, 13 Drawing Sheets

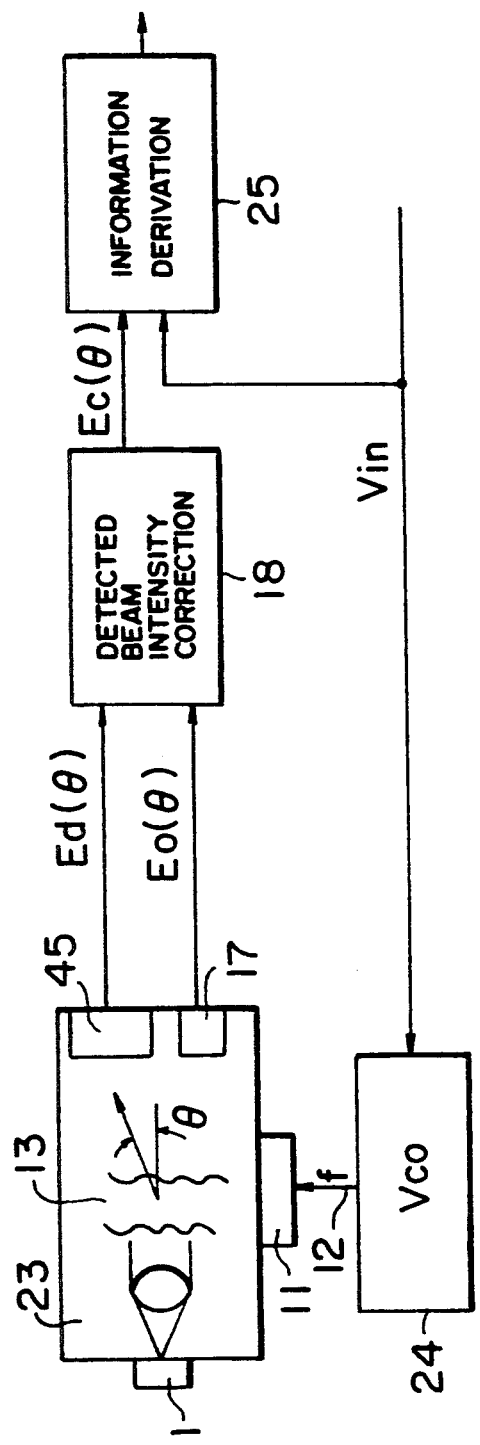
F I G. 4
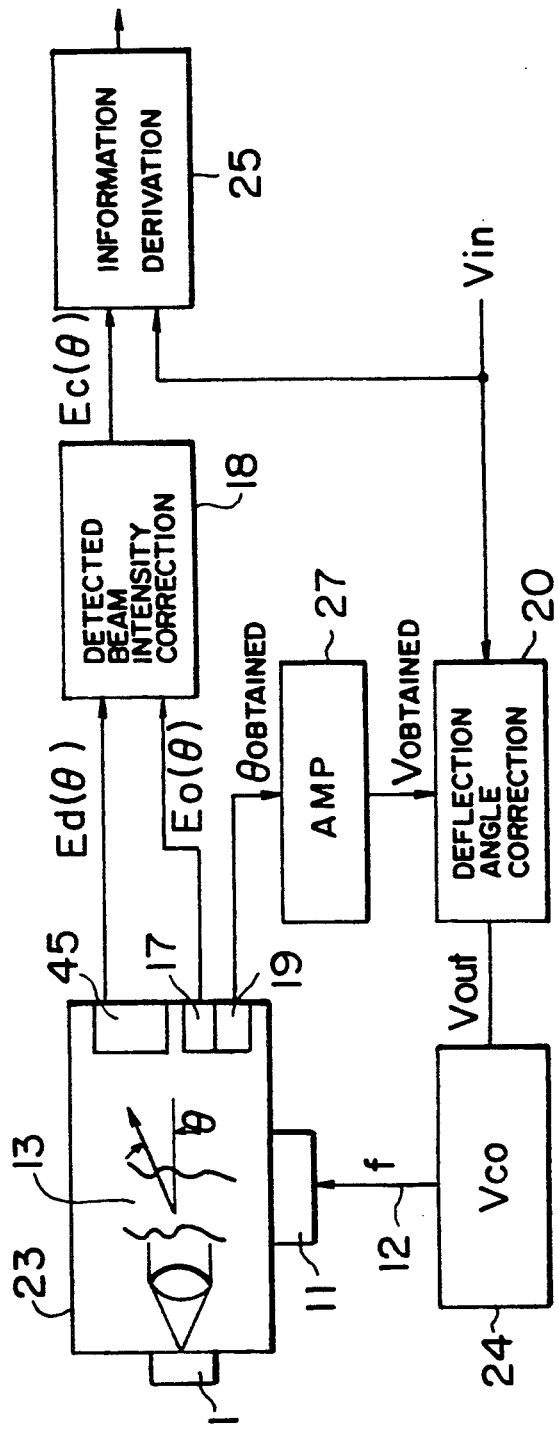
F I G. 5

INFORMATION DETECTING SYSTEM OF SCANNING TYPE

BACKGROUND OF THE INVENTION

This invention relates to an information detecting system of scanning type using an optical integrated circuit of waveguide type, and more particularly to an information detecting system of the type described above which is suitable to reduce the size and improve the accuracy of alignment of, for example, an alignment optical system for use in a semiconductor manufacturing apparatus.

Discrete parts including lenses, mirrors and prisms were used to constitute prior art optical systems such as an pickup for a compact disk and an alignment optical system for use in a semiconductor wafer exposure apparatus commonly called a stepper. Because of such a construction, not only difficulty was encountered for reducing the size and weight of the prior art alignment optical system, but also complex system adjustment was required during assembling the prior art optical system. Thus, the prior art optical system had the problem of high costs.

An optical integrated circuit of waveguide type has been proposed as a means for solving the problem pointed out above. FIG. 1 shows an optical integration circuit of waveguide type similar to that shown in FIG. 1 at page 40 of "AN INTEGRATED-OPTIC DISK PICKUP DEVICE", the Technical Research and Study Report OQE85-72 (1985) reported in The Institute of Electronics and Communication Engineers of Japan. This report refers to application of such an optical integration circuit to a pickup for an optical disk such as a compact disk or an optical disk memory. Referring to FIG. 1, a laser beam emitted from a semiconductor laser 1 is guided toward a waveguide layer 3 in the form of a thin film of a dielectric material formed on a substrate 2. A beam splitter 4 and a focusing grating coupler 5 constituted by a diffraction grating are provided on the waveguide layer 3 so as to focus the laser beam, and the focused laser beam 6 forms a team spot 8 on an optical disk 7. The laser beam 6 modulated by signal pits 9 formed on the optical disk 7 passes through the focusing grating coupler 5 and the beam splitter 4 again and after being split into halves, reaches a photodetector 10 composed of four elements. Electrical output signals appear from the four elements of the photodetector 10, and, on the basis of these electrical signals, tracking and focusing errors are detected together with information obtained from the signal pits 9.

In the form of the optical integrated circuit of waveguide type shown in FIG. 1, the passive optical elements such as the lens and the beam splitter are built in the substrate. However, a beam deflecting function using a SAW (surface acoustic wave) device which is an active optical element can also be added to the optical integrated circuit of waveguide type shown in FIG. 1. Such an optical integrated circuit is described, for example, at pages 179-180 of "Optical Integrated Circuits" edited by the members in The Meeting of Optical Engineers of the Japan Society of Applied Physics, 1988. FIG. 2 shows an optical integrated circuit of waveguide type similar to that described in the above publication. Referring to FIG. 2, titanium (Ti) is diffused in the surface of a substrate 2 of lithium niobate ($LiNbO_3$) to form an optical waveguide layer 3, and a SAW electrode 11 of a material such as aluminum (Al) is formed on the optical waveguide layer 3. When a high-frequency a.c. signal 12 is applied to this SAW electrode 11, the SAW electrode 11 is excited to generate surface acoustic wave (SAW) 13. At this time, socalled acoustic Bragg diffraction of an incident laser beam 14 is caused by the function of a diffraction grating having periodically changing film thickness and index of refraction, and the incident laser beam 14 is split into a beam of zero-th order 15 and a diffracted beam of first order 16. By changing the frequency of a high-frequency a.c. signal 12, the angle between the zero-th order beam 15 and the first order diffracted beam 16 is changed, so that the beam deflecting function is exhibited.

An example of application of such an optical integrated circuit of waveguide type to an optical disk is described at pages 13-14 of "Micro-Optics News," Vol. 6, No. 3 (1988) edited by The Japan Society of Applied Physics. This application intends to shorten the tracking access time for the optical disk by the SAW type beam deflecting device.

These optical integrated circuits of waveguide type described hereinbefore are manufactured by a process substantially similar to the known process for manufacturing various semiconductor devices, and the process includes the steps of exposure-development, etching and diffusion. Therefore, the optical integrated circuit of waveguide type having a high degree of dimensional accuracy can be fabricated in a similar manner to the fabrication of the semiconductor devices without requiring any assembling adjustment, and the optical system thus realized has a reduced size and weight and can stably operate.

JP-A-59-74625 discloses a method for scanning or diffracting a laser beam by a galvanomirror thereby detecting a diffracted beam pattern on a semiconductor wafer.

SUMMARY OF THE INVENTION

The optical integrated circuits of waveguide type described above features that they have a small size and a light weight and are operable with high stability, and, when such features are utilized, they find applications over a wide range in addition to the application to the pickup for optical disks.

In the process for manufacturing, for example, semiconductor devices, various optical systems are required for various kinds of positioning apparatus (alignment apparatus), bar-code readers for FA (factory automation) purpose, various kinds of monitoring apparatus, etc. Those optical systems have been composed of discrete parts. Therefore, the prior art optical system has had a large size in itself which leads to difficulty of mounting on a desired apparatus. Also, the prior art optical system has had such other problems that there is a limitation in a function or functions to be additionally provided, and the accuracy of information detection tends to be degraded. Further, because of the requirement for assembling and adjustment with high dimensional accuracy, the prior art optical system has inevitably become expensive. In particular, the prior art optical system has not necessarily been suitable for use in a monitoring apparatus which are required to be mounted on various apparatus in a factory for the purpose of factory automation.

The optical integrated circuit of waveguide type having the SAW type beam deflecting device can, in principle, replace the prior art optical system composed of various discrete parts and can exhibit a great effect when used for such application.

However, because the optical integrated circuits of waveguide type shown in FIGS. 1 and 2 have primarily been designed for use in a pickup for a so-called optical disk such as a compact disk or an optical disk memory, they have had such a problem that the accuracy of information detection is insufficient when applied to some of other apparatus.

It is therefore an object of the present invention to provide a small-sized information detecting system of scanning type which detects the relation between the frequency used for driving a SAW type beam deflecting device and the deflection angle or the diffraction efficiency of the SAW type beam deflecting device thereby improving the accuracy of detection of information.

In accordance with one aspect of the present invention which attains the above object, there is provided an information detecting system of scanning type comprising: a substrate formed with an optical waveguide layer; a laser oscillator generating a laser beam propagating through the optical waveguide layer; a beam deflecting device of surface acoustic wave type formed on the optical waveguide layer; means for taking out at least part of the laser beam from the optical waveguide layer and irradiating a specimen with the laser beam; control means for generating an a.c. signal applied to the beam deflecting device of surface acoustic wave type and also controlling the frequency of the a.c. signal in response to a control signal controlling the irradiating position of the laser beam, thereby controlling scanning of the specimen with the laser beam taken out from the optical waveguide layer; and detecting means for detecting at least one of the position and the intensity of the laser beam scanning the specimen with respect to the control signal.

That is, the information detecting system of scanning type according to the present invention has added thereto at least one of a system monitoring the intensity of the laser beam emanating from the optical integrated circuit of waveguide type and a system monitoring a system controlling the absolute value of the beam deflection angle or monitoring the absolute value of the beam deflection angle. The diffraction efficiency of the beam deflecting device of SAW type is not fixed but changes in dependence on the beam deflection angle. Also, the beam deflection angle of the beam deflecting device of SAW type deviates more or less from the value specified by the control signal. These phenomena obstruct information detection with high accuracy. According to the present invention, any change in the diffraction efficiency and any deviation of the beam deflection angle are corrected by the function of the detecting means, so that information can be detected with high accuracy.

BRIEF DESCRIPTION OF THE DRAWINGS

FIG. 4 is a block diagram showing the structure of a preferred embodiment of the present invention.

FIG. 5 is a block diagram showing the structure of another preferred embodiment of the present invention.

DESCRIPTION OF THE PREFERRED EMBODIMENTS

Preferred embodiments of the scanning type information detecting system according to the present invention will now be described in detail with reference to the drawings.

An embodiment of the present invention will first be described with reference to FIGS. 3 and 4.

Figure 1:
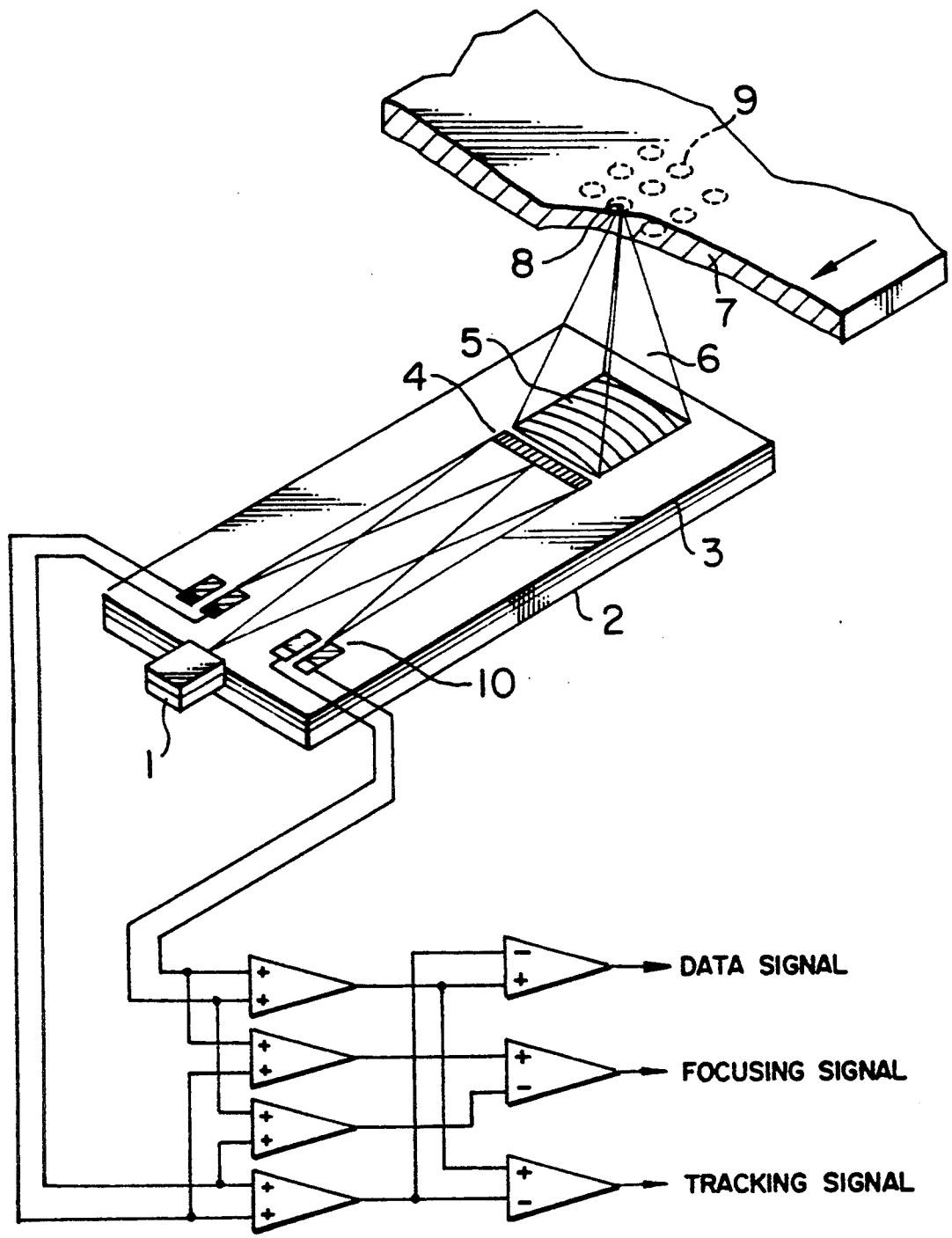
FIG. 1 schematically shows the structure of a prior art optical integrated circuit of waveguide type.
Figure 2:
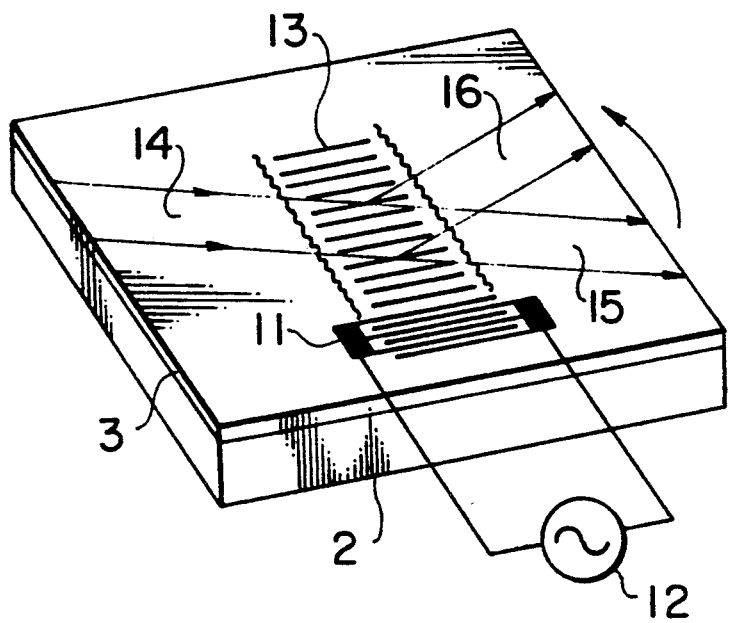
FIG. 2 schematically shows the structure of another optical integrated circuit using a surface acoustic wave device and is useful for explanation of the manner of beam deflection.
Figure 3:
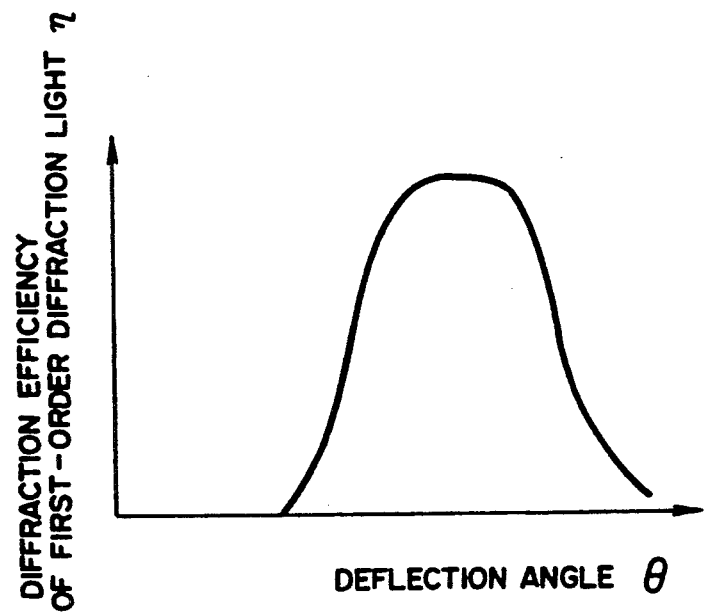
FIG. 3 is a graph showing the relation between the beam deflection angle and the diffraction efficiency $\eta$ of a beam deflecting device of SAW type.

FIG. 3 shows the relation between the beam deflection angle $\theta$ and the diffraction efficiency $\eta$ of a beam deflecting device of SAW type. When positional information is to be detected with high detection accuracy by means of a waveguide type optical integrated circuit having a function of SAW light beam deflection, the diffraction efficiency of the beam deflecting device of SAW type dependent upon the beam deflection angle $\theta$ is not negligible. Also, the absolute value of the angle $\theta$ of beam deflection by the SAW type beam deflecting device becomes important.

FIG. 4 is a block diagram showing the structure of the first embodiment. In FIG. 4, a change in the intensity of a laser beam finally emanating from an optical integrated circuit 23 is detected. Such a change in the beam intensity is attributable to a change in the first-order diffracted beam diffraction efficiency of a SAW type beam deflecting device dependent upon the beam deflection angle $\theta$ and attributable also to a change in the efficiency of a grating coupler dependent upon the beam entrance and exit angles. Referring to FIG. 4, a laser beam emitted from a semiconductor laser 1 is guided toward an optical integrated circuit 23 of waveguide type to cause generation of surface acoustic wave (SAW) 13, and, as a result, the laser beam is diffracted and deflected by an angle $\theta$. For the purpose of generating the SAW 13, a voltage Vin is applied to a VCO circuit 24 which generates a high-frequency a.c. signal 12 having a frequency $f$ changing in proportion to the level of the input voltage Vin, and this high-frequency a.c. signal 12 is applied to a SAW electrode 11. An emanating beam intensity sensor 17 generates an output signal Eo($\theta$), and a data sensor 45 generates a data output signal Ed($\theta$). These signals Eo($\theta$) and Ed($\theta$) are then corrected by a detected beam intensity correcting circuit 18 according to the following equation (1) so that a corrected stable output signal Ec($\theta$) can be generated from the correcting circuit 18:

$$Ec(\theta) = A \times Ed(\theta)/Eo(\theta) \quad (1)$$

where A is a constant, and $\theta$ is the angle of beam The detected beam intensity may be corrected in real time. However, when the system is continuously maintained stable, the value of Ec($\theta$) can be calculated by obtaining beforehand and storing the data corresponding to Eo($\theta$) and then merely substituting the value of Ed($\theta$) in the equation (1). An information deriving circuit 25 computes information on the basis of the values of Ec($\theta$) and Vin. The function of the sensor 17 will be described in detail later.

Figure 6:
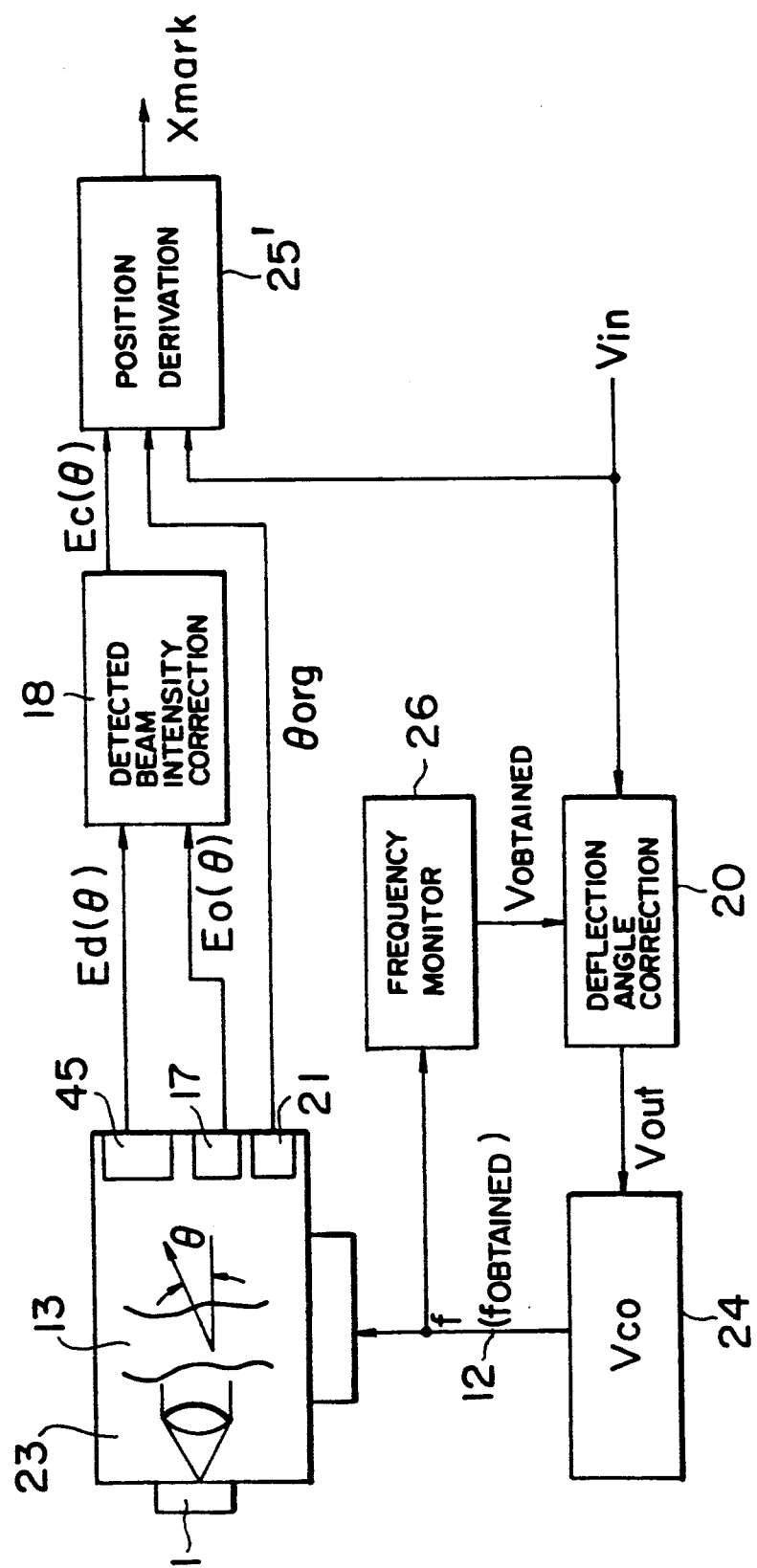
FIG. 6 is a block diagram showing the structure of still another preferred embodiment of the present invention.

FIGS. 5 and 6 are block diagrams showing the structure of other embodiments respectively of the present invention.

The absolute value of the beam deflection angle $\theta$ is influenced by the factors including the condition of manufacturing the SAW type beam deflecting device, the ambient atmospheric temperature and the wavelength of the laser beam. Therefore, for the purpose of controlling the absolute value of the beam deflection angle $\theta$, the data of the actually attained beam deflection angle $\theta_{obtained}$ is obtained by monitoring by a beam deflection angle monitor 19 as shown in FIG. 5, and the monitor output signal representing this beam deflection angle $\theta_{obtained}$ is applied to an amplifier 27 to obtain a voltage signal $V_{obtained}$. Then, this voltage signal $V_{obtained}$ is applied to a deflection angle correcting circuit 20 together with the target deflection angle control voltage Vin so as to produce a SAW control signal Vout which is applied to the VCO circuit 24. Suppose, for example, V'out is the SAW control signal corresponding to the attained monitored beam deflection angle $\theta_{obtained}$. Then, the beam deflection angle $\theta$ is corrected according to the following equation (2):

$$Vout = V'out + Vin - V_{obtained} \quad (2)$$

This closed control loop can be arranged in the following two forms:

(1) The form shown in FIG. 5, wherein the laser beam emanating from the optical integrated circuit of waveguide type 23 is detected by the deflection angle monitor 19 such as a position sensor, and the output of the deflection angle monitor 19 is fed back to control the SAW drive frequency.

(2) The form shown in FIG. 6, wherein the external control signal for the SAW type beam deflecting device is usually applied in the form of a voltage signal Vin, and this voltage signal Vin is converted by the VCO circuit 24 into a frequency $f_{obtained}$ which is used to drive the SAW type beam deflecting device. Therefore, the form shown in FIG. 6 is a modification of the conventional system described above. That is, in the form shown in FIG. 6, the SAW drive frequency $f_{obtained}$ generated from the VCO Circuit 24 is monitored by a frequency monitor 26, and the output of the frequency monitor 26 is fed back through the beam deflection angle correcting circuit 20 to provide the control signal Vout applied to the VCO circuit 24.

The accuracy of information detection in FIG. 5 is better than that in FIG. 6. Employment of the closed control loop shown in FIG. 5 or FIG. 6 is to be determined depending on the information detection accuracy required for the system.

In the embodiment shown in FIG. 6, the information deriving circuit 25 shown in FIG. 5 is replaced by a position deriving circuit 25'. In FIG 6, an absolute origin sensor 21 incorporated in the optical integrated circuit 23 generates an output signal representing the origin $\theta org$, and the position deriving circuit 25' computes the position of a mark such as an alignment mark provided on, for example, a semiconductor wafer in response to the application of the signal $\theta org$, Ec($\theta$) and Vin.

The beam deflection angle monitor 19 shown in FIG. 5 and that of the absolute origin sensor 21 shown in FIG. 6 will be described in detail later.

Another embodiment of the present invention will now be described with reference to FIGS. 7 and 8.

When the SAW type beam deflecting device is used as, for example, a means for equispeed scanning, a monitor for detecting the absolute origin is required. FIG. 7 is a block diagram showing the structure of a position deriving system, and FIG. 8 shows signal waveforms appearing in the system shown in FIG. 7.

Figure 7:
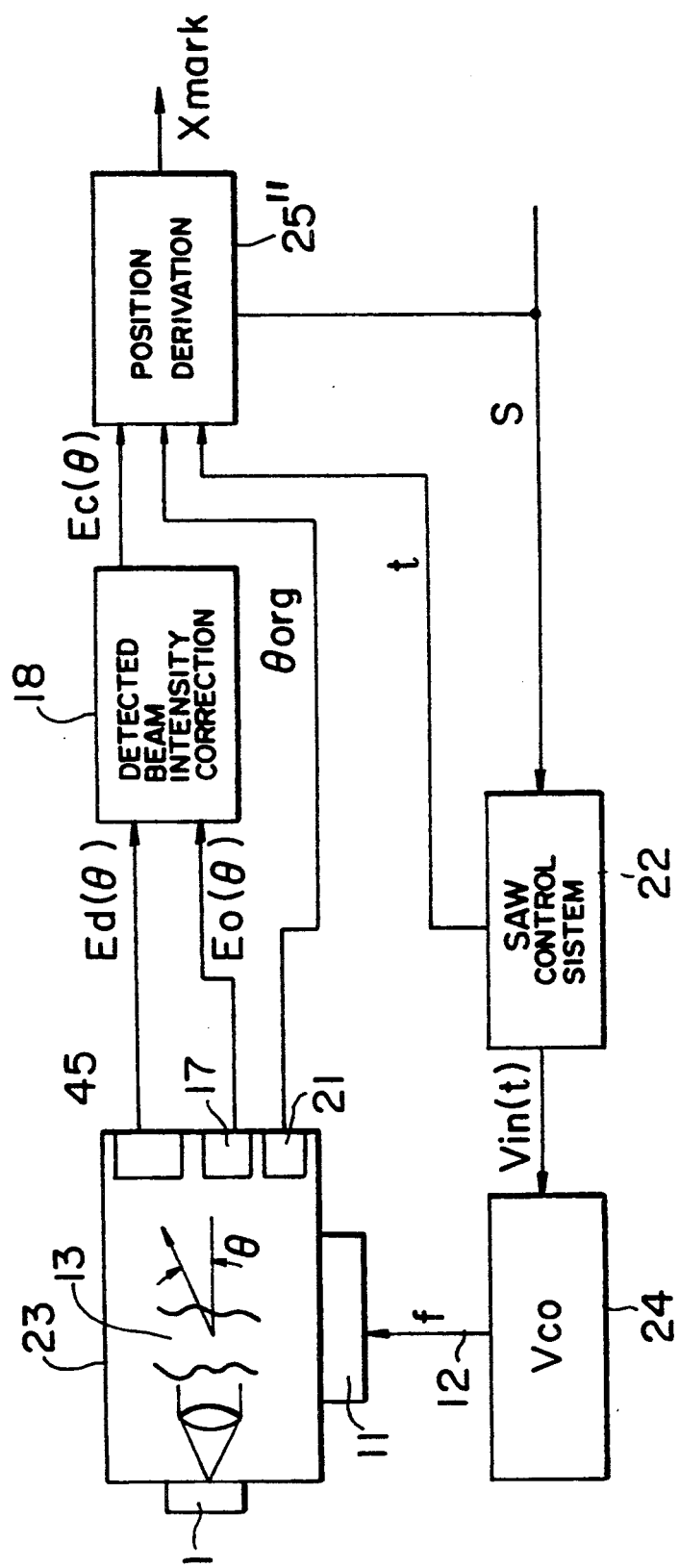
FIG. 7 is a block diagram showing the structure of yet another preferred embodiment of the present invention.
Figure 8:
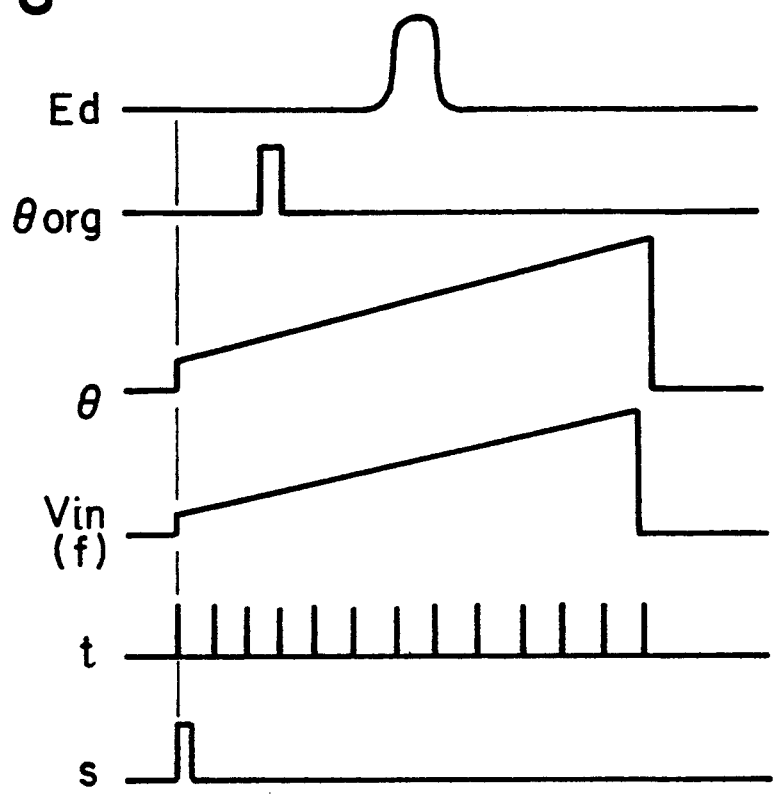
FIG. 8 is a waveform diagram showing signal waveforms appearing in the system shown in FIG. 7.

Referring to FIG. 7, a start signal S having a waveform as shown in FIG. 8 is applied to a position deriving circuit 25". This start signal S is also applied to a SAW control system 22 to start the operation of the SAW control system 22. The SAW control system 22 generates a synchronizing signal t and a SAW control signal Vin(t) having waveforms as shown in FIG. 8. The SAW type beam deflecting device is driven by the high-frequency a.c. signal 12 generated from the VCO circuit 24 so that the laser beam deflection angle $\theta$ is changed in a manner as shown in FIG. 8. The absolute origin sensor 21 incorporated in the optical integrated circuit of SAW type 23 generates the origin signal $\theta$org in the form of, for example, an interrupt signal having a waveform as shown in FIG. 8. This origin signal $\theta$org and the synchronizing signal t are applied together with the signal EC($\theta$) to the position deriving circuit 25" which analyzes the detected data signal Ed.

Figure 9:
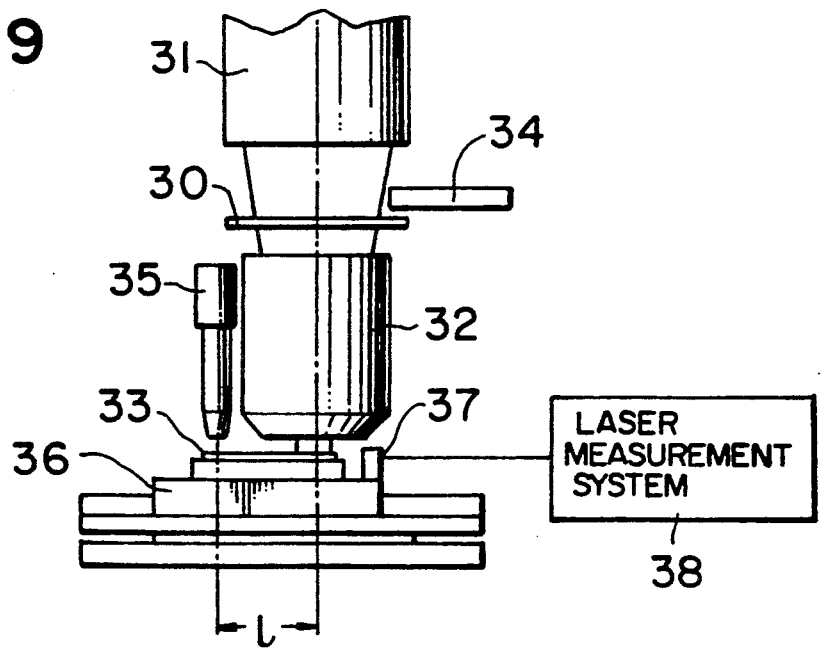
FIG. 9 is an example of prior art semiconductor wafer exposure apparatuses.
Figure 10:
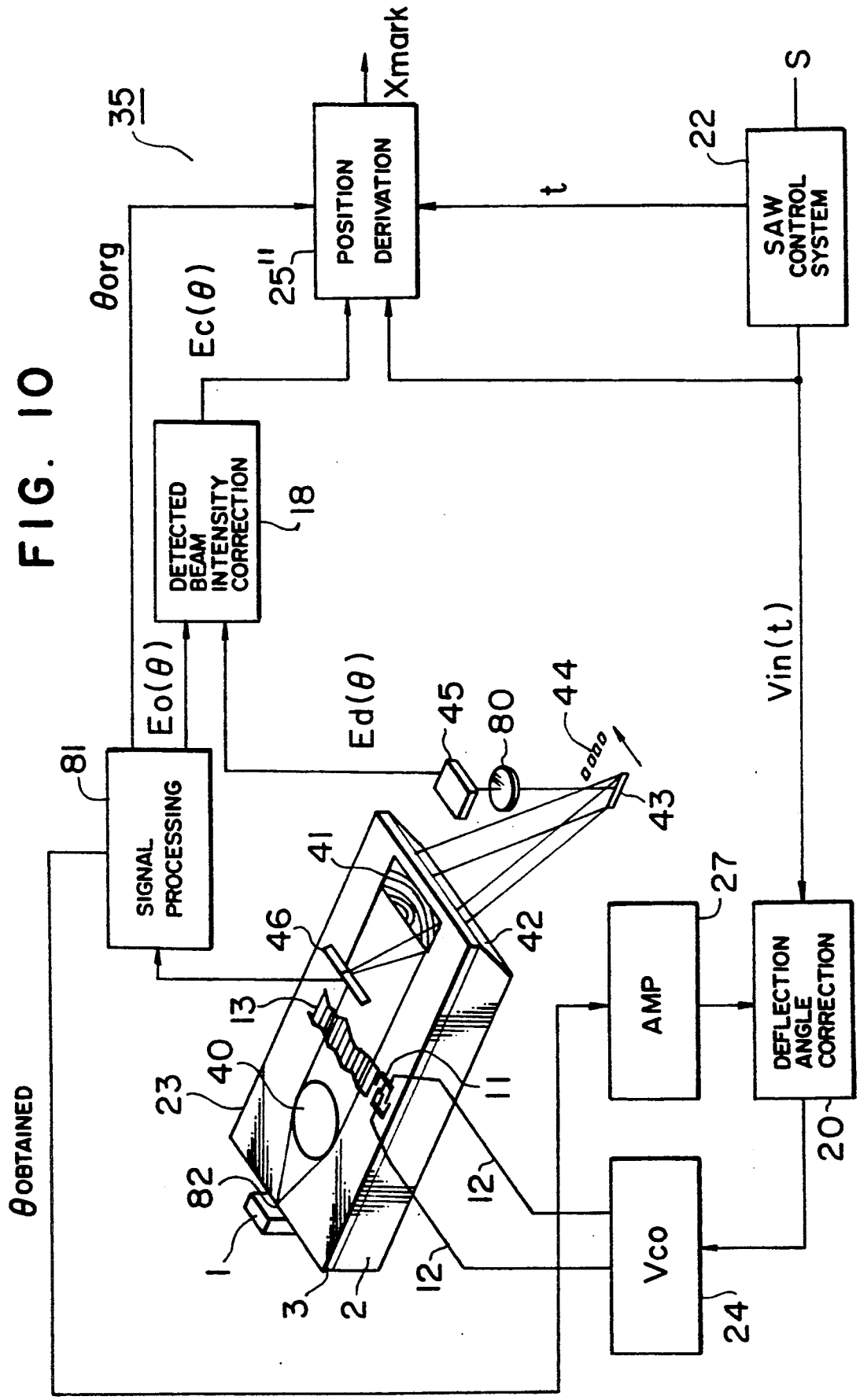
FIG. 10 is a block diagram showing in perspective view the structure of the scanning type information detecting system of the present invention mounted on the exposure apparatus shown in FIG. 9.

Another embodiment of the present invention will now be described with reference to FIGS. 9 and 10. The embodiment of FIG. 10 is a case where the optical integrated circuit of waveguide type employed in the present invention is applied to a wafer alignment optical system used in, for example, a semiconductor wafer exposure apparatus. FIG. 9 shows the structure of a prior art semiconductor wafer exposure apparatus of step and repeat type commonly called a stepper.

Referring to FIG. 9, when a reticle 30 is irradiated with ultraviolet light such as g-line light or i-line light directed from an illumination system 31, a reduced image of the reticle 30 is projected through a projection lens 32 on a semiconductor wafer 33 placed on a wafer stage 36. In this case, a reticle alignment optical system 34 and a wafer alignment optical system 35 are used to attain alignment of the position of the reticle 30 relative to that of the wafer 33. After attainment of the position alignment, a reflection mirror 37 mounted on the wafer stage 36 and a laser measurement system 38 are used, while the wafer stage 36 is being moved with very high accuracy, so as to expose one chip after another according to the step and repeat method. The smaller the distance l between the axis of the wafer alignment optical system 35 and that of the projection lens 32, the lesser is an error that may be attributable to the laser measurement system 38, so that the desired high-accuracy position alignment between the reticle 30 and the wafer 33 can be achieved during the exposure. However, in the case of the prior art method using the discrete parts, it has been impossible to shorten the above distance l from the viewpoint of the practical mounting difficulty.

FIG. 10 shows that the use of the optical integrated circuit of waveguide type employed in the present invention can reduce the size of the wafer alignment optical system 35 thereby shortening the distance l shown in FIG. 9. Referring to FIG. 10 in which like reference numerals are used to designate like parts appearing in FIG. 7, an optical integrated circuit 23 of waveguide type includes a waveguide layer 3 formed by diffusing, for example, Ti in the surface of a substrate 2 of, for example, LiN$_b$O$_3$. A laser beam emitted from a semiconductor laser 1 is incident on the waveguide layer 3 through an end-to-end coupling 82 and is then converted into a parallel beam by a geodesic lens 40. When the frequency of a high-frequency a.c. signal 12 applied from a VCO circuit 24 to a SAW electrode 11 is changed, the period of a change in the film thickness and in the index of refraction of the beam deflecting device exciting SAW 13 is changed, which in turn deflects the light. Therefore, a slit-like form irradiating laser beam 43 provided by a focusing grating coupler 41 (corresponding to a cylindrical lens) can be used to scan a specimen (a semiconductor wafer). An alignment mark 44 in the form of, for example, a linear dot pattern consisting of dots having a specific pitch is provided on the specimen (the semiconductor wafer). When the slit-like form irradiating laser beam 43 traverses the alignment mark 44, a first-order diffracted laser beam generated from the dot pattern and condensed by a condenser lens 80 is detected by a mark sensor or detection sensor 45. The condenser lens 80 acts to condense or focus only the first-order diffracted beam generated from the specimen (thee semiconductor wafer).

The substrate 2 has a beam emanating surface 42 perpendicular to the beam exit angle, and this surface 42 is coated with a half-mirror coating. Therefore, part of the slit-like form irradiating laser beam 43 is reflected by this surface 42 of the substrate 2, and the reflected beam passes through the focusing grating coupler 41 to reach a sensor array 46.

Figure 11:
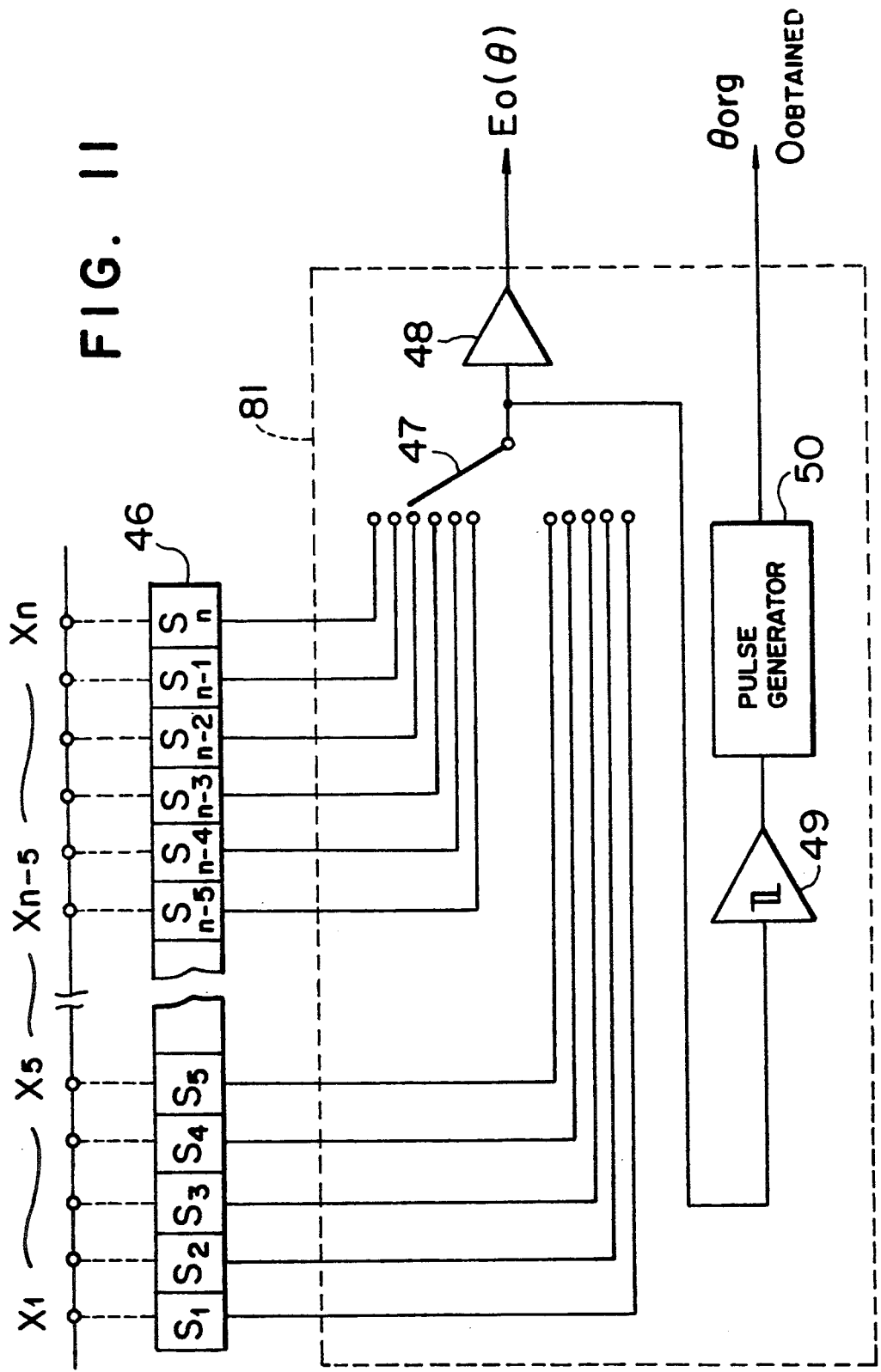
FIG. 11 shows one form of the practical structure of the sensor employed in the present invention so as to detect the value of, for example, $Eo(\theta)$.
Figure 12:
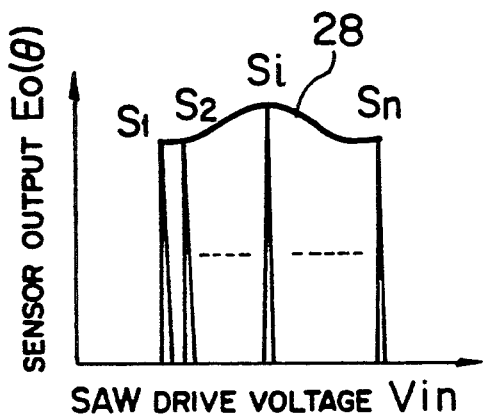
FIG. 12 shows the output waveform of the sensor shown in FIG. 11 relative to the SAW drive voltage.

FIG. 11 shows the detailed practical structure of the sensor array 46. Referring to FIG. 11, photodiode type sensors $S_1$ to $S_n$ are arrayed as shown, and the output of a specific one of these sensors $S_1$ to $S_n$ is selected by an analog switch 47 provided in a signal processing circuit 81. The value of the output of each of these sensors $S_1$ to $S_n$ corresponds to a change in the beam diffraction efficiency of the SAW type beam deflection device relative to the SAW beam deflection angle $\theta$ shown in FIG. 3 or relative to the SAW drive voltage Vin. Therefore, the relation between the sensor output Eo($\theta$) and the SAW drive voltage Vin is represented by an envelope 28 as shown in FIG. 12 when the analog switch 47 is selectively turned on while repeatedly changing the SAW drive voltage Vin in the form of a triangular waveform or a sawtooth waveform. Accordingly, an amplifier 48 in the signal processing circuit 81 generates a data signal representing the data Eo($\theta$) corresponding to the envelope 28, and such a data signal is applied to the detected beam intensity correcting circuit 18. Thus, the combination of the sensor array 46, the analog switch 47 and the amplifier 48 can attain the function of the sensor 17 shown in FIGS. 3, 4, 6 and 7.

Figure 13:
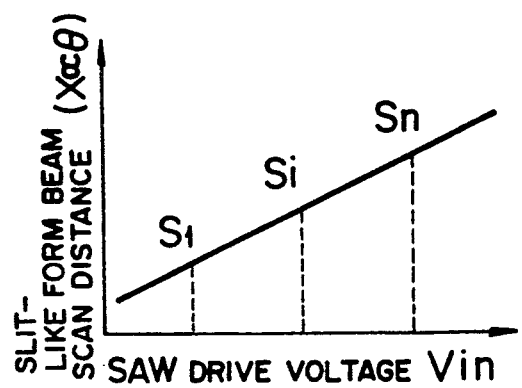
FIG. 13 shows the relation between the distance of scanning with the slit-like form irradiating beams and the SAW drive voltage in FIG. 11.

On the other hand, the combination of a Schmitt trigger circuit 49 and a pulse generator 50 detects the timing of appearance of peak outputs from the respective sensors $S_1$ to $S_n$. Thus, as shown in FIG. 13, the relation between the scanning distance x with the slit-like form irradiating beam (where x is a function of the obtained beam deflection angle $\theta$) and the SAW drive voltage Vin, that is, the $\theta$-Vin function is obtained. Also, because the output of the pulse generator 50 is the signal representing the attained beam deflection angle $\theta_{obtained}$, the combination of the sensor array 46, the analog switch 47, the Schmitt trigger 49 and the pulse generator 50 can attain the function of the beam deflection angle monitor 19 shown in FIG. 5. Further, when, for example, $\theta$org represents the output timing of the sensor $S_1$ in the sensor array 46, this sensor $S_1$ can attain the function of the absolute origin sensor 21 shown in FIGS. 6 and 7. The data Eo($\theta$) used for correcting the defected beam intensity is stored in the detected beam intensity correcting circuit 18, while the $\theta$-Vin function is stored in a beam deflection angle correcting circuit 20 shown in FIG. 10, so that they can be used as correction data when the alignment mark 44 is actually detected by a position deriving circuit 25".

The signal processing circuit 81 may be integrated together with the sensor array 46 as part of the optical integrated circuit 23.

The sensor array 46 employed in the embodiment shown in FIG. 10 may be replaced by a position sensor. This position sensor is disposed at a position conjugate with respect to the specimen (the semiconductor wafer), and the differential output of the position sensor is detected so as to detect or derive the position of the alignment mark. Also, the intensity of the emanating laser beam can be detected on the basis of the total beam intensity received by the position sensor.

In the embodiment shown in FIG. 10, the system used in the embodiment shown in FIG. 5 is employed for correcting the beam deflection angle $\theta$. However, when the requirement for the accuracy of information detection is not so strict, the system shown in FIG. 6 may be employed.

Figure 15:
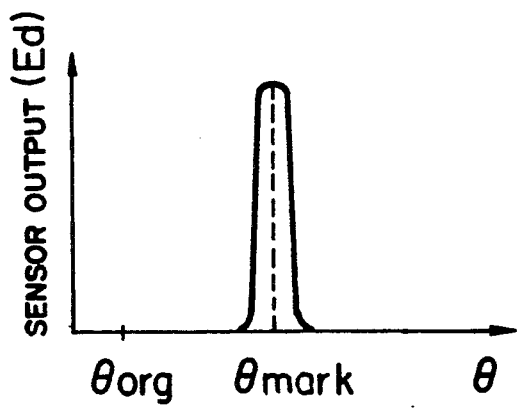
FIG. 15 shows the relation between the output of the sensor detecting the value of Ed and the beam deflection angle $\theta$ when the linear dot pattern shown in FIG. 14 is scanned.

When the optical system shown in FIG. 10 is used to direct the slit-like form irradiating laser beam 43 toward and onto the alignment mark 44 in the form of the linear dot pattern formed on the specimen (the semiconductor wafer) 33, and the irradiating laser beam 43 scans the alignment mark 44 while changing the SAW drive frequency $f$ by a VCO circuit 24, a detection sensor 45 generates its output signal $Ed(\theta)$ as shown in FIG. 15. This sensor output signal $Ed(\theta)$ is applied to the detected beam intensity correcting circuit 18, and both the value of $Ed(\theta)$ and the detected beam intensity correcting data $Eo(\theta)$ obtained already are substituted in the equation (1) to calculate the value of $Ec(\theta)$ generated from the detected beam intensity correcting circuit 18. Then, the $\theta$-Vin function is corrected in the position deriving circuit 25" or the beam deflection angle correcting circuit 20 in a manner as described already with reference to FIGS. 5, 6 and 7. In the position deriving circuit 25", the angular distance between the waveform center $\theta$mark and the absolute origin $\theta$org shown in FIG. 15 is multiplied by the focal distance of the focusing grating coupler 41 so as to detect the position Xmark of the alignment mark 44 in the form of the linear dot pattern. It is apparent that the absolute origin $\theta$org is not necessary when the distance between two linear dot patterns is to be detected.

Figure 14:
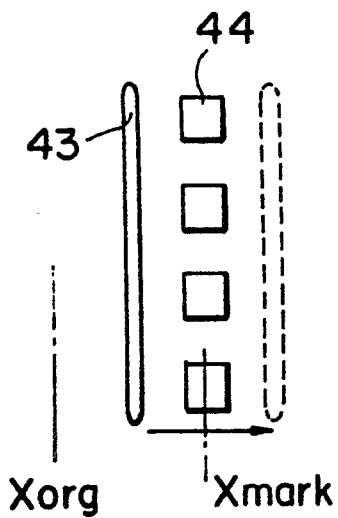
FIG. 14 shows a linear dot pattern scanned with the slit-like form irradiating beam.
Figure 16:
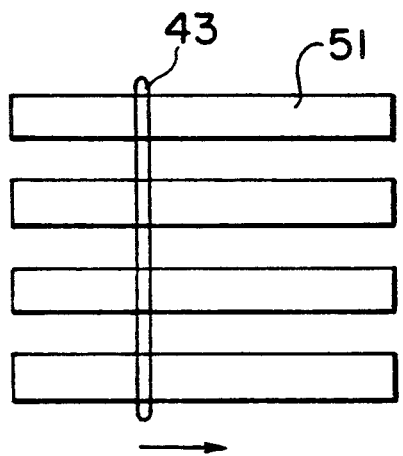
FIG. 16 shows a pattern of plural lines scanned with the slit-like form irradiating beam.
Figure 17:
FIG. 17 shows the output of the sensor detecting the value of Eo relative to the beam deflection angle $\theta$ when the pattern of plural lines shown in FIG. 16 is scanned.

According to another method for obtaining the data $Eo(\theta)$ used for the detected beam intensity correction, a pattern 51 consisting of linear line segments spaced apart by the same pitch as that of the mark 44 shown in FIG. 14 is formed on the specimen (the semiconductor wafer or its substitute 33 as shown in FIG. 16, and the slit-like form irradiating laser beam 43 is directed toward and onto this linear line pattern 51, so that an output signal Eo of the sensor 45 having a waveform as shown in FIG. 17 can be directly obtained.

Figure 18:
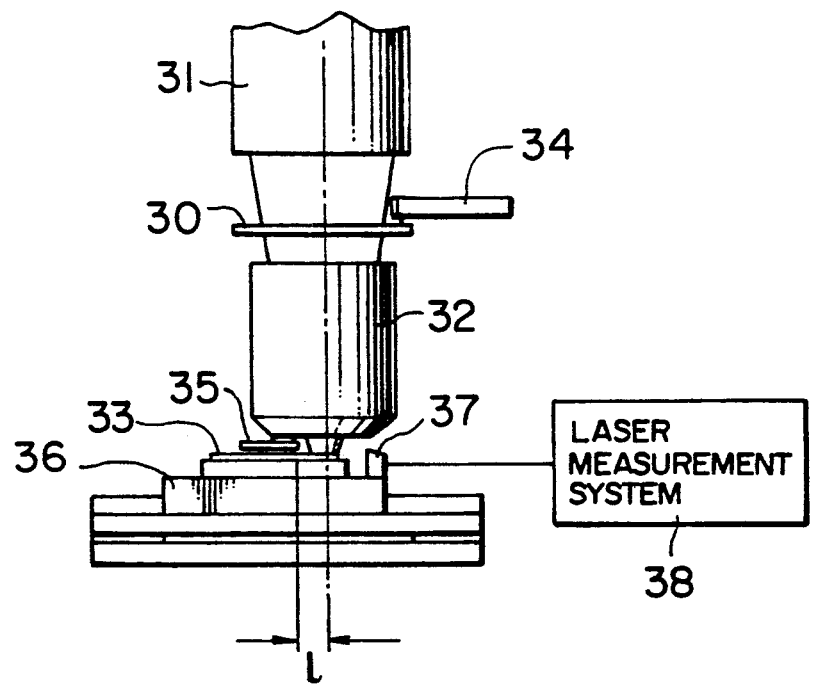
FIG. 18 is a schematic front elevation view of a semiconductor wafer exposure apparatus equipped with a scanning type information detecting system according to the present invention.

FIG. 18 shows the semiconductor wafer exposure apparatus on which the optical system 35 shown in FIG. 10 is mounted. It will be seen in FIG. 18 that the optical system 35 can be mounted beneath the projection lens 32, so that the distance 1 between the wafer alignment optical system 35 and the projection lens 32 can be shortened. Thus, the laser measurement system 38, whose output error increases with the increase in the distance 1, can generate an output having a minimized error. Further, because the optical system 35 itself has a very light weight, and direct mounting of the optical system 35 on the projection lens 32 does not provide any practical problem from the aspect of rigidity, the exposure apparatus itself can be stabilized in its structural aspect, and the exposure can be made with high alignment accuracy In the embodiment shown in FIG. 10, only one of the X-axis and Y-axis is referred to for the purpose of alignment. However, the structure may be such that alignment in the directions of both the X-axis and the Y-axis can be attained, or the structure may be such that rotation of chips can also be measured in the directions of the three axes.

Further, although the embodiment shown in FIG. 10 refers to the application of the present invention to the exposure apparatus of reduction projection type only among various kinds of semiconductor wafer exposure apparatuses, the present invention is also applicable to an electron beam lithography apparatus. In a prior art electron beam lithography apparatus, an alignment optical system having a large distance 1 or a reflected-electron detection alignment system that does not permit easy viewing of an alignment mark formed beneath a photo-resist layer can only be used. Therefore, the application of the optical system of the present invention to the prior art electron beam lithography apparatus is quite effective for improving the low alignment accuracy which is the inherent drawback of the prior art exposure apparatus.

In the embodiment shown in FIG. 10, the first-order diffracted beam is detected by the detection sensor 45. However, when the detection sensor 45 is located at the position capable of detecting a higher-order diffracted beam, the distance 1 can be shortened to the value nearly equal to zero.

Figure 19A:
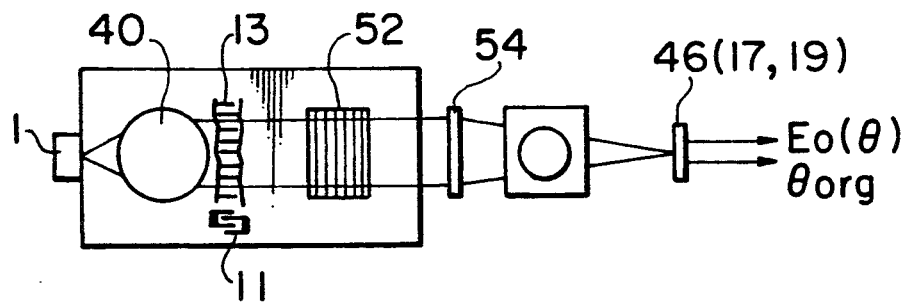
FIGS. 19A and 19B are a schematic plan view and a schematic front elevation view respectively of yet another preferred embodiment of the present invention.
Figure 19B:
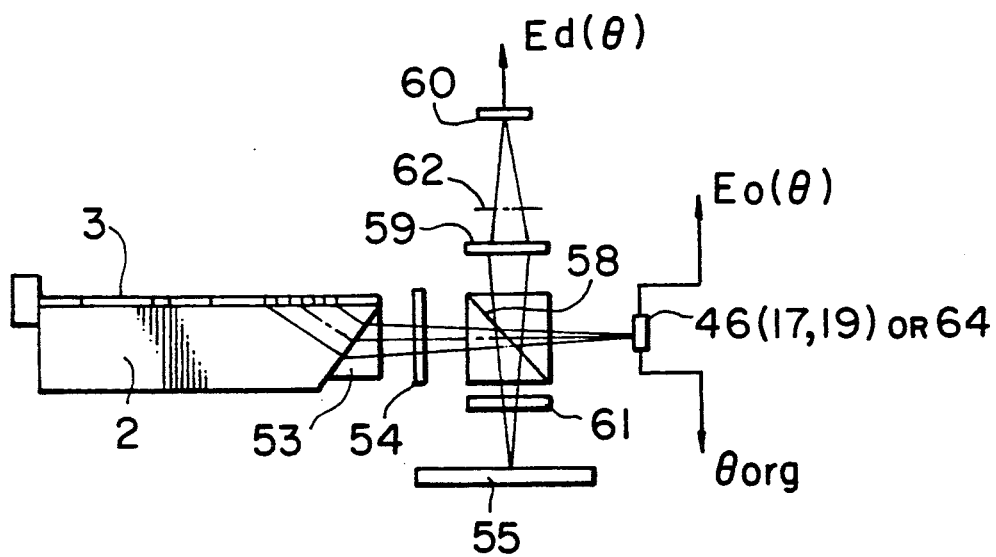

FIGS. 19A and 19B show another embodiment of the present invention. This embodiment shows application of the present invention to factory automation (FA) utilizing a bar-code reader which is now indispensably required for management of distribution of goods. A prior art bar-code reader composed of various discrete parts has been relatively large in size and expensive. Therefore, the prior art bar-code reader has not been suitable for the purpose of FA because it must be mounted on each of various apparatuses of various kinds in a factory. FIGS. 19A and 19B show that the optical integrated circuit of waveguide type according to the present invention is used to solve the prior art problem.

Figure 20:
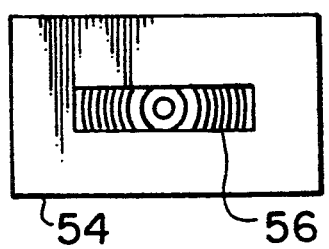
FIG. 20 is a schematic side elevation view of the Fresnel lens shown in FIGS. 19A and 19B.
Figure 21:
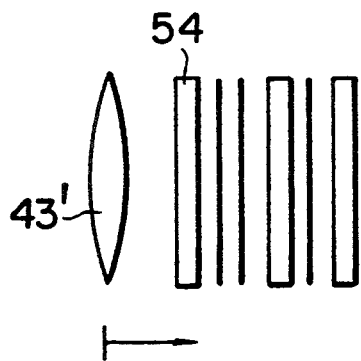
FIG. 21 shows a bar-code pattern scanned with the slit-like form irradiating beam.

Referring to FIGS. 19A and 19B in which like reference numerals are used to designate like parts appearing in FIG. 10, a waveguide layer 3 is formed on a substrate 2, and a laser beam emitted from a semiconductor laser 1 is incident on the waveguide layer 3 through an end-to-end coupling and then converted into a parallel beam by a geodesic lens 40. After the laser beam is deflected by the function of SAW 13 produced by a SAW electrode 11, the parallel laser beam emanates from a grating coupler 52. After the laser beam is then deflected in the horizontal direction by a glass prism 53 having an index of refraction lower than that of the substrate 2, the laser beam is focused by a Fresnel lens 54 so as to irradiate a specimen (a semiconductor wafer) 55. The Fresnel lens 54 has a rectangular pupil 56 as shown in FIG. 20. Thus, according to the theory of diffraction, the laser beam turned into a slit-like form irradiating beam 43" as shown in FIG. 21 irradiates the specimen 55. A bar code 57 is provided on the specimen 55, and the slit-like form irradiating beam 43" scans the specimen 55 in response to the excitation of the SAW 13 by the SAW electrode 11.

Figure 22:
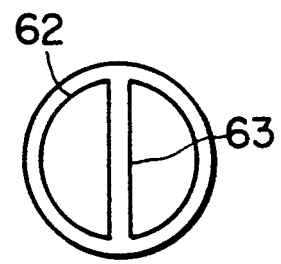
FIG. 22 schematically shows the configuration of a spatial filter.

Reading of the bar code 57 shown in FIG. 21 will now be described. Suppose, for example that the bar code 57 is in the form of an alternate black and white pattern as shown in FIG. 21. When a white portion in that pattern is irradiated with the slit-like form irradiating laser beam 43', the reflected beam passes through a polarization beam splitter 58 shown in FIG. 19B and is then focused by a lens 59 to be detected by a sensor 60. A ¼ wavelength plate 61 is provided to change the direction of polarization of the reflected beam through an angle of 90° so that the reflected beam may not return toward the waveguide layer 3. On the other hand, when the bar code 57 is in the form of an alternate concavity and convexity pattern, a spatial filter 62 having a beam intercepting portion 63 as shown in FIG. 22 is disposed in the spatial frequency region (the focal position) of the lens 59 as shown in FIG. 19B to intercept the zero-th order beam (the reflected beam) so that an output signal indicating the edge between the concavity and the convexity in the pattern can be generated from the sensor 60.

Figure 23:
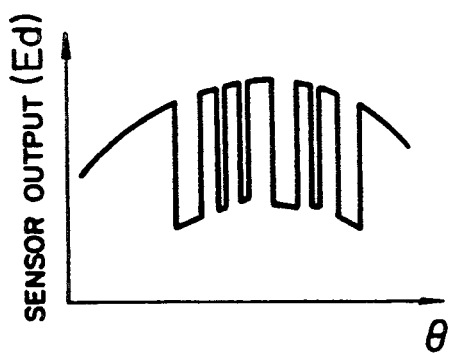
FIG. 23 shows the output of the sensor detecting the value of Ed relative to the beam deflection angle $\theta$ before the beam deflection angle is corrected in FIG. 21.
Figure 24:
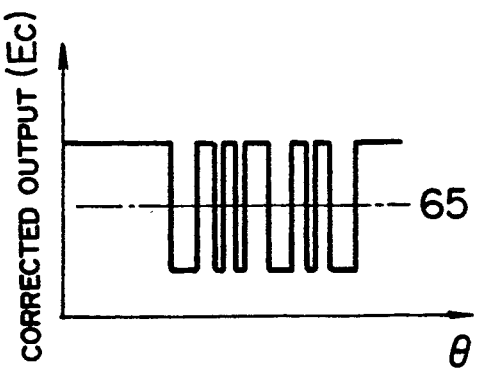
FIG. 24 shows the sensor output Ec relative to the beam deflection angle $\theta$ after the beam deflection angle is corrected in FIG. 21.

The output signal ED($\theta$) of the sensor 60 in the optical system tends to become unstable depending on the beam deflection angle $\theta$ as shown in FIG. 23. Therefore, a sensor array 46 which is the same as that shown in FIG. 11 is disposed at the position conjugate with respect to the specimen 55, and an emanating beam intensity sensor 17 which is the same as that shown in FIG. 4 is used so as to obtain a detected beam intensity correcting data Eo($\theta$) as shown in FIG. 17. When the spacing between the bars in the bar code 57 is wide enough to ensure a sufficient S/N ratio, the $\theta$-Vin function as shown in FIG. 13 is unnecessary. In such a case, a single photo sensor 64 may be disposed in place of the sensor array 46 so as to directly obtain the detected beam intensity correcting data Eo($\theta$) shown in FIG. 17. Also, without storing the data Eo($\theta$) in a memory and processing the stored data, the output Eo($\theta$) of the sensor 64 may be supplied to an analog division circuit to be processed in real time according to the equation (1). Consequently, an output signal Ec as shown in FIG. 24 is finally obtained. When the output signal Ec is clipped at a predetermined threshold level 65, the information of the bar code 57 can be read. Further, the deflection angle monitor 19 shown in FIG. 5 the beam deflection angle $\theta$.

Another embodiment of the present invention will now be described with reference to FIGS. 25A, 25B and 25C in which like reference numerals are used to designate like parts appearing in FIGS. 19A and 19B. The embodiment shown in FIGS. 25A, 25B and 25C shows application of the present invention to an apparatus which measures the height of a specimen or which brings a specimen to a selected position.

Figure 25A:
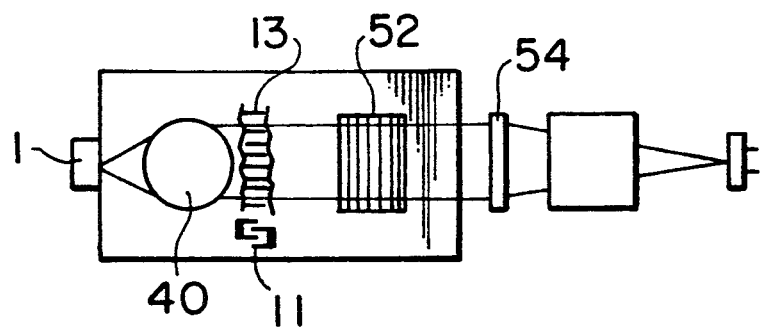
FIGS. 25A, 25B and 25C are a schematic plan view, a schematic front elevation view and a schematic side elevation view respectively of another preferred embodiment of the present invention.
Figure 25B:
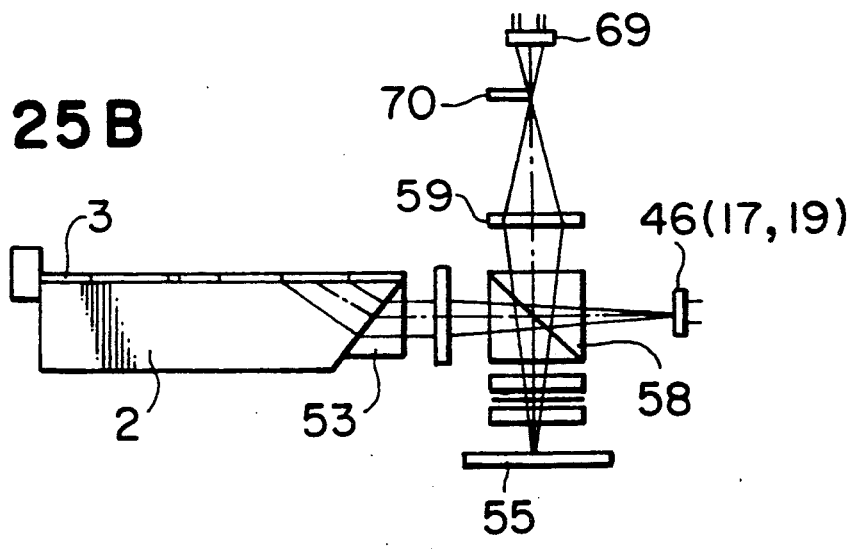
Figure 25C:
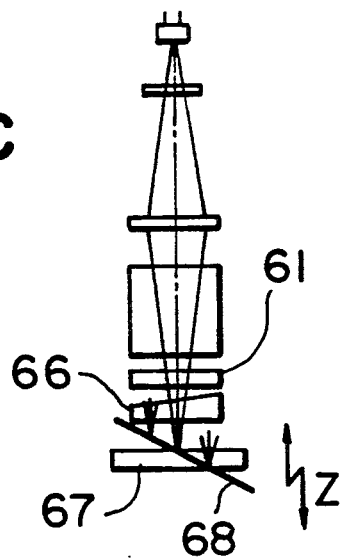

Referring to FIGS. 25A, 25B and 25C, a waveguide layer 3 is formed on a substrate 2, and a laser beam emitted from a semiconductor laser 1 is incident on the waveguide layer 3 through an end-to-end coupling and then converted into a parallel beam by a geodesic lens 40. After the parallel laser beam is deflected by the function of SAW 13 produced by a SAW electrode 11, the parallel laser beam emanates from a grating coupler 52. After the laser beam is then deflected in the horizontal direction by a glass prism 53 having an index of refraction lower than that of the substrate 2, the laser beam is focused by a Fresnel lens 54 so as to irradiate a specimen (a semiconductor wafer) 55. The Frensel lens 54 has a rectangular pupil 56 as shown in FIG. 20 or has a circular pupil, so that a slit-like form or circular irradiating beam 67 irradiates the specimen 55. When now the entire optical system is inclined or a wedge-shaped glass plate 66 as best shown in FIG. 25C is inserted into the optical system, the scanning plane 68 of the irradiating beam 67 deflected by the function of the SAW 13 makes an angle with respect to the surface of the specimen 55. The beam reflected from the specimen 55 passes through a lens 59 and is received by a two-element sensor 69. A knife-edge 70 is located at the position conjugate with respect to the scanning plane 68 of the irradiating beam 67, so that the outputs Ea and Eb of the two sensor elements respectively of the two-element sensor 69 have the difference given by (Ea−Eb).

Figure 26:
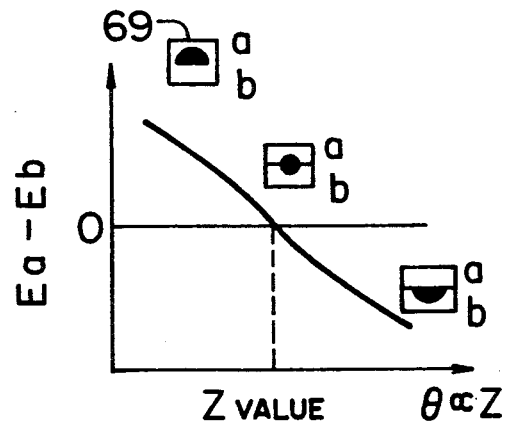
FIG. 26 shows the relation between the sensor output and the height of the specimen in the system shown in FIGS. 25A, 25B and 25C.

As shown in FIG. 26, the value of (Ea−Eb) changes with the scanning by the irradiating beam 67, and this value is zero at the intersection between the surface of the specimen 55 and the scanning plane 68 of the irradiating beam 67. Therefore, the height of the specimen 55 is detected by detecting the beam deflection angle $\theta$ at which the value of (Ea−Eb) becomes zero. Therefore, after splitting the irradiating beam 67 by a beam splitter 58, one of the split beam portions is directed toward the specimen 55, while the other beam portion is received by a sensor array 46 which is the same as that shown in FIG. 11. Then, when the corrected data is obtained according to FIG. 13 or 15, the height of the specimen 55 can be measured with high accuracy.

The foregoing description of various embodiments of the present invention refer to the functions for optical alignment, bar-code reading and specimen height detection. It is apparent, however, that the present invention is also applicable to all of optical systems including an optical integrated circuit of waveguide type which is substantially constructed to be suitable for correction of the detected beam intensity and derivation of the $\theta$-Vin function.

Further, part of the optical system included in each of the embodiments may only be integrated into an optical integrated circuit or may be composed of discrete parts.

Further, in lieu of the end-to-end coupling used for coupling the semiconductor laser to the optical integrated circuit of waveguide type, a grating coupler, a prism coupler or the like may be used. Also, in lieu of the geodesic lens, a focusing grating or the like may be used. Further, the laser beam source is in no way limited to the semiconductor laser. Furthermore, in lieu of the sensor array, a position sensor may be used.

It will be understood from the foregoing detailed description that the present invention can provide a monitoring system which does not require any moving parts, which is small-sized and inexpensive and which can detect position information with high accuracy. Therefore, when the present invention is applied to various existing apparatus in a factory, the apparatus can be made suitable for the desired factory automation, and the functions of the existing apparatus can be greatly improved.

We claim:

1. A position information detecting system of scanning type comprising:
   a laser source;
   an optical waveguide layer formed on the substrate, the optical waveguide for propagating a laser beam generated from said laser source;
   a laser beam deflecting device of surface acoustic wave type provided on said optical waveguide, said laser beam deflected device for deflecting said laser beam propagated through said optical waveguide in accordance with frequency of an a.c. signal applied;

means for irradiating a deflected laser beam deflected by said laser beam deflecting device and propagated through said optical waveguide so as to scan said deflected laser beam on a specimen having indicia thereon;

photo-detection means for detecting a data output signal by receiving at least one of: a reflected light, a transmitted light or a diffracted light obtained from said indicia by scanning said focused laser beam;

converting means for converting a control signal to said frequency of an a.c. signal; and position detecting means for detecting position information of said indicia in accordance with a variation of a corrected signal obtained by correcting said data output signal in accordance with a displacement value of said focused laser beam communicated to said converting means by said control signal.

2. A position information detecting system according to claim 1 further comprising:

first detecting means for detecting at least intensity of said deflected laser beam; and first correcting means for correcting said data output signal to said corrected signal in accordance with said intensity of said deflected laser beam detected by said first detecting means such that said corrected signal is stabilized in relation with a scanning amount.

3. A position information detecting system according to claim 2, wherein said first detecting means is located at a position substantially conjugate with respect to said specimen.

4. A position information detecting system according to claim 2, wherein said first detecting means is provided on said substrate.

5. A position information detecting system according to claim 1, wherein said converting means includes a second correcting means for correcting said frequency of an a.c. signal by correction to said control signal to obtain an absolute value of a scanning amount.

6. A position information detecting system according to claim 5 further comprising:

a beam deflection angle detection means for detecting a beam deflection value corresponding to a deflection accomplished by said laser beam deflecting device so that said second correcting means corrects said frequency of an a.c. signal in accordance with said beam deflection value detected by said beam deflection angle detection means.

7. A position information detecting system according to claim 1, wherein said irradiating means includes a beam focusing optical means for focusing said deflected laser beam toward and onto said specimen.

8. A position information detecting system according to claim 1, wherein said position detecting means detects the position of the information in the form of a linear pattern provided on said specimen.

9. An information detecting system according to claim 1, wherein said specimen includes a wafer and said indicia is an alignment mark provided thereon so that said information detecting system is used for an alignment optical system for a semiconductor manufacturing apparatus.

10. An information detecting device according to claim 1, wherein said indicia is a bar code and said information detecting device is used for a bar-code reader.

11. An information detecting device according to claim 1, said specimen is inclined relative to a scanning plane so that said information detecting device is used for a height detection apparatus.

12. A position information detecting system according to claim 1 further comprising:

a position sensor including means for providing a predetermined position and means for obtaining an absolute origin signal by detection of said reflected laser beam such that the position detecting means detects said position information as absolute information by said absolute origin signal.

13. A position information detecting system according to claim 1, wherein photo-detection means includes means for providing diffracted light generated from a linear pattern provided on said specimen.

14. An information detecting system of scanning type comprising:

a substrate formed with an optical guide layer;

a laser oscillator emitting a laser beam;

a beam deflecting device of surface acoustic wave type formed on said optical waveguide layer;

beam focusing and irradiating means for focusing at least part of the laser beam derived from said optical waveguide layer and irradiating a specimen with said focused laser beam;

control means for controlling, in response to a SAW control signal, the frequency of a high-frequency voltage signal applied to said surface acoustic wave type beam deflecting device so as to scan said specimen with said laser beam directed from said beam focusing and irradiating means;

first detecting means for detecting the intensity of said focused laser beam scanning said specimen in response to said surface acoustic wave control signal;

second detecting means for receiving at least one of: a reflected portion, a transmitted portion or a diffracted portion of said focused laser beam scanning said specimen and converting said received beam into a corresponding signal, thereby detecting information provided on said specimen;

correcting means for correcting said signal generated from said second detecting means on the basis of the intensity of said laser beam detected by said first detecting means; and means for deriving said information on said specimen on the basis of the output signal of said correcting means and aid surface acoustic wave control signal.

15. An information detecting system according to claim 14, wherein said first detecting means includes means for receiving part of said laser beam directed from said beam focusing and irradiating means and, on the basis of said received part of said laser beam, detecting the intensity of said focused laser beam scanning said specimen.

16. An information detecting system according to claim 15, wherein said beam focusing and irradiating means is formed at right angles with respect to the emanating direction of said laser beam and includes an end surface of said substrate provided with a half-mirror coating, and said part of said laser beam is that directed from said beam focusing and irradiating means and reflected from said end surface of said substrate.

17. An information detecting system according to claim 16, further comprising means for successively detecting the position of said laser beam shifted in response to said SAW control signal and correcting means for correcting said control signal on the basis of the difference between the detected beam position and the beam position specified by said control signal and applying said corrected control signal to said control means.

18. An information detecting system according to claim 16, further comprising means for monitoring the output of said control means and correcting means for correcting said control signal on the basis of the difference between the output of said monitoring means and said control signal and applying said corrected control signal to said control means.

19. An information detecting system according to claim 15, wherein said first detecting means includes a sensor array composed of a plurality of photo diodes, and said sensor array receives part of said laser beam directed from said beam focusing and irradiating means, and, on the basis of said received part of said laser beam, detects the position and/or the intensity of said focused laser beam scanning said specimen.

20. An information detecting system according to claim 19, wherein an output of a specific one of said photo diodes constituting said sensor array indicates a particular point.

21. An information detecting system according to claim 20, wherein said particular point is an absolute origin.

22. A position information detecting system of a scanning type comprising:
- a laser source;
- an optical waveguide layer, formed on a substrate, for propagating a laser beam generated from said laser source;
- a surface acoustic wave laser beam deflecting device provided on said optical waveguide, said laser beam deflecting device including means for deflecting said laser beam propagated through said optical waveguide in accordance with frequency of an applied a.c. signal;
- means for irradiating a deflected laser beam deflected by said laser beam deflecting device and propagated through said optical waveguide so as to communicate said deflected laser beam on a specimen having indicia thereon;
- photo-detection means for detecting an electric signal by receiving at least one of: a reflected light, a transmitted light or a diffracted light obtained from said indicia by scanning said focused laser beam;
- converting means for converting a control signal to said frequency of an a.c. signal;
- first detecting means for detecting at least intensity of said deflected laser beam deflected by said laser beam deflecting device;
- first correcting means for correcting said electric signal to said corrected signal in accordance with said intensity of said deflected laser beam detected by said first detecting means so as to obtain said corrected signal stabilized in relation with a scanning amount; and
- position detecting means for detecting position information of said indicia in accordance with a variation of a corrected signal obtained by correcting said electric signal in relation with a displacement of said focused laser beam communicated to said converting means by said control signal.

23. A position information detecting system of scanning type comprising:
- a laser source;
- an optical waveguide layer formed on the substrate, the optical waveguide for propagating a laser beam generated from said laser source;
- a surface wave acoustic laser beam deflecting device provided on said optical waveguide, said laser beam deflecting device including means for deflecting said laser beam propagated through said optical waveguide in accordance with a frequency of an a.c. signal applied thereto;
- means for irradiating a deflected laser beam deflected by said laser beam deflecting device and propagated through said optical waveguide so as to scan said deflected laser beam on a specimen having indicia thereon;
- photo-detection means for producing an electric signal by receiving at least one of a reflected light, a transmitted light and a diffracted light obtained from said indicia by scanning said focused laser beam;
- converting means for converting a control signal to said frequency of an a.c. signal and provided by a second correcting means for correcting said frequency of an a.c. signal by correcting said control signal so as to obtain an absolute value of a scan signal level; and
- position detecting means for detecting position information of said indicia in accordance with a variation of a corrected signal obtained by correcting said electric signal in accordance with said scan signal level of said focused laser beam given to said converting means by said control signal.

24. An alignment optical system for a semiconductor manufacturing apparatus, comprising:
- illumination means for generating an ultraviolet light to illuminate a reticle;
- a projection lens for projecting said light transmitted via said reticle onto a wafer;
- a reticle alignment optical system disposed at a location between said illumination means and said projection lens;
- a stage disposed at such a location that allows said stage to receive said light from said projection lens, for movably supporting said wafer;
- means mounted on said stage for measuring a moved distance of said stage; and
- means disposed in a gap between said projection lens and said stage for detecting an alignment mark provided on said wafer;
- a laser source;
- an optical waveguide layer formed on the substrate, for propagating a laser beam generated from said laser source;
- a surface acoustic wave laser beam deflecting device, provided on said optical waveguide, including means for deflecting said laser beam propagated through said optical waveguide in accordance with frequency of an a.c. signal applied thereto;
- means for irradiating said wafer with a deflected laser beam deflected by said laser beam deflecting device and propagated through said optical waveguide so as to scan said deflected laser beam on said wafer having alignment indicia disposed thereon;
- means for controlling the frequency of said a.c. voltage;

first detection means for detecting position relative to the frequency of said a.c. voltage and intensity of the laser beam irradiating and scanning said wafer;

second detection means for receiving diffraction light from said wafer and converting the received light to an electrical signal to detect information regarding the alignment indicia;

means, connected to said controlling means, for correcting said frequency on the basis of the position of the light detected by said first detection means; and third detection means for detecting the position of said alignment indicia on the basis of at least said information obtained by said second detection means and said intensity of the light detected by said first detection means.

25. A bar-code reader comprising:

means for scannably generating laser light;

means for guiding said laser light from said generating means onto a specimen having a bar code disposed thereon;

first detection means for detecting the laser light after exposure to said specimen;

second detection means for receiving a portion of said laser light generated from said generation means to detect intensity of said generated laser light; and means for reading said bar code on the basis of outputs of said first and second detection means;

wherein said generation means includes:

a laser source, an optical waveguide laser, formed on a substrate, for propagating a laser beam generated from said laser source, an acoustic wave type laser beam deflecting means, provided on said optical waveguide, for deflecting said laser beam propagated through said optical waveguide in accordance with frequency of an a.c. signal applied thereto, and means for controlling the frequency of said a.c. voltage so as to scan said specimen with said deflected laser beam.

* * * * *

UNITED STATES PATENT AND TRADEMARK OFFICE
CERTIFICATE OF CORRECTION

PATENT NO. : 5,121,449

DATED : June 9, 1992

INVENTOR(S) : Masataka Shiba, et al.

It is certified that error appears in the above-identified patent and that said Letters Patent is hereby corrected as shown below:

Claim 12, column 14, line 13, after "absolute" insert --position--.

Claim 14, column 14, line 51, delete "aid" and replace with --said--.

Signed and Sealed this

Twentieth Day of July, 1993

Attest:

MICHAEL K. KIRK

*Attesting Officer*    Acting Commissioner of Patents and Trademarks